(12) United States Patent
Fernandez

(10) Patent No.: US 8,819,954 B1
(45) Date of Patent: Sep. 2, 2014

(54) TAPE MEASURE ASSEMBLY

(76) Inventor: Tomas Fernandez, Miami, FL (US)

(*) Notice: Subject to any disclaimer, the term of this patent is extended or adjusted under 35 U.S.C. 154(b) by 255 days.

(21) Appl. No.: 13/506,656

(22) Filed: May 8, 2012

(51) Int. Cl.
*G01B 3/10* (2006.01)

(52) U.S. Cl.
CPC ............ *G01B 3/1084* (2013.01); *G01B 3/1041* (2013.01); *G01B 3/1071* (2013.01)
USPC ................... 33/668; 33/768; 33/769; 33/770; 33/42

(58) Field of Classification Search
CPC ...... G01B 3/10; G01B 3/1041; G01B 3/1071; G01B 3/1084
USPC ............................... 33/668, 768, 769, 770, 42
See application file for complete search history.

(56) References Cited

U.S. PATENT DOCUMENTS

| | | | |
|---|---|---|---|
| 2,349,670 A * | 5/1944 | Moxey | 33/27.03 |
| 4,103,426 A * | 8/1978 | Robin | 33/27.03 |
| 4,255,856 A | 3/1981 | Mackie | |
| 5,197,195 A * | 3/1993 | Aikens | 30/293 |
| D336,443 S | 6/1993 | Dickey | |
| 5,349,760 A | 9/1994 | DeVito | |
| 5,430,952 A | 7/1995 | Betts | |
| 5,542,184 A * | 8/1996 | Beard | 30/293 |
| 5,966,820 A | 10/1999 | Cornacchio et al. | |
| 6,070,338 A | 6/2000 | Garity | |
| 6,694,622 B2 * | 2/2004 | Kim | 30/293 |
| 6,763,603 B2 * | 7/2004 | Carrabino | 33/770 |
| 6,912,799 B1 * | 7/2005 | Smith | 33/770 |
| 7,260,898 B2 * | 8/2007 | Snelson | 33/668 |
| 7,490,415 B1 * | 2/2009 | Cubbedge | 33/770 |
| D615,429 S | 5/2010 | Mendoza | |
| 7,900,364 B2 * | 3/2011 | Lee | 33/27.03 |
| 8,020,306 B2 * | 9/2011 | Grivas et al. | 33/42 |
| 2012/0073152 A1 * | 3/2012 | McGahan | 33/32.3 |
| 2012/0317828 A1 * | 12/2012 | Richard | 33/701 |

* cited by examiner

*Primary Examiner* — Christopher Fulton

(57) ABSTRACT

A tape measure assembly is provided for selectively positioning a marker or a knife adjacent to an end of a tape measure. The assembly includes a tape measure having a housing. A tape is coupled to and positioned in the housing. The tape has a free end extendable from the housing. A tang is coupled to the free end of the tape. An attachment member is selectively couplable to the tang. A tool aperture extends through the attachment member. A tool, either a knife or a writing device, has a first end insertable through the tool aperture. A locking device is coupled to the attachment member and engages the tool when the first end is inserted through the tool aperture.

11 Claims, 4 Drawing Sheets

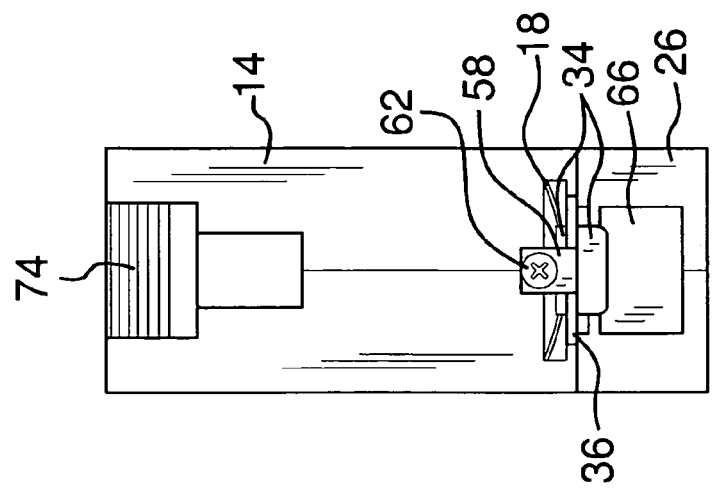
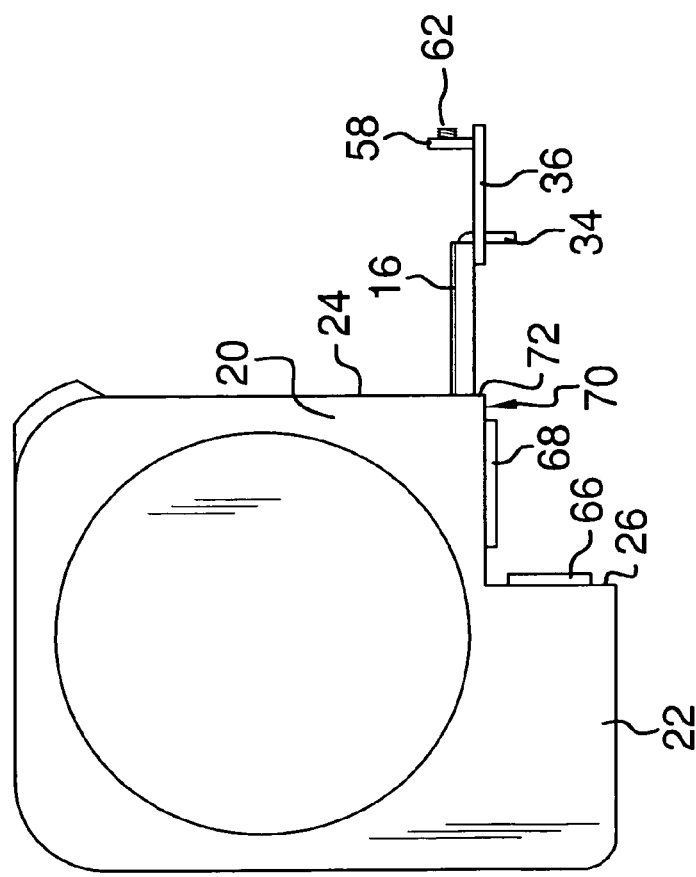

TAPE MEASURE ASSEMBLY

BACKGROUND OF THE DISCLOSURE

Field of the Disclosure

The disclosure relates to tape measure devices and more particularly pertains to a new tape measure device for selectively positioning a marker and a knife adjacent to an end of a tape measure.

SUMMARY OF THE DISCLOSURE

An embodiment of the disclosure meets the needs presented above by generally comprising a tape measure having a housing. A tape is coupled to and positioned in the housing. The tape has a free end extendable from the housing. A tang is coupled to the free end of the tape. An attachment member is selectively couplable to the tang. A tool aperture extends through the attachment member. A tool, either a knife or a writing device, has a first end insertable through the tool aperture. A locking device is coupled to the attachment member and engages the tool when the first end is inserted through the tool aperture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a side view of an embodiment of the disclosure.

FIG. 4 is a front view of an embodiment of the disclosure.

DESCRIPTION OF THE PREFERRED EMBODIMENT

Figure 1:
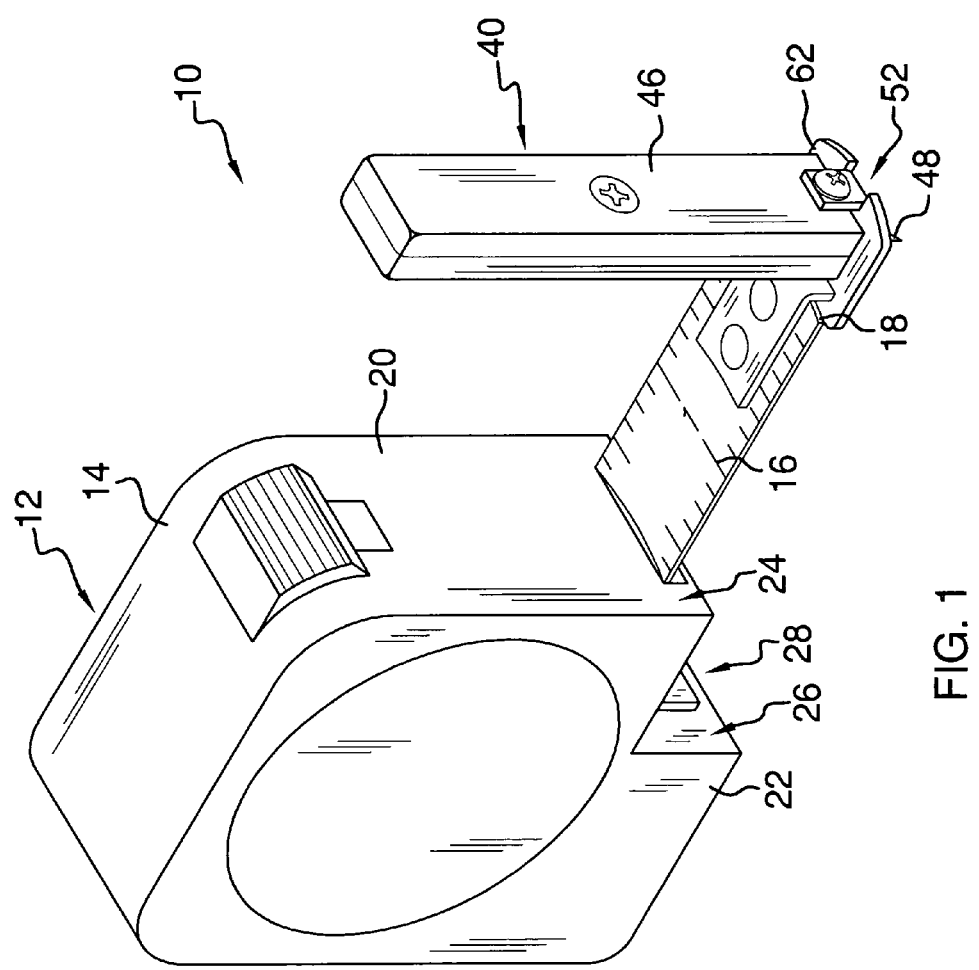
FIG. 1 is a top front side exploded perspective view of a tape measure assembly according to an embodiment of the disclosure.
Figure 2:
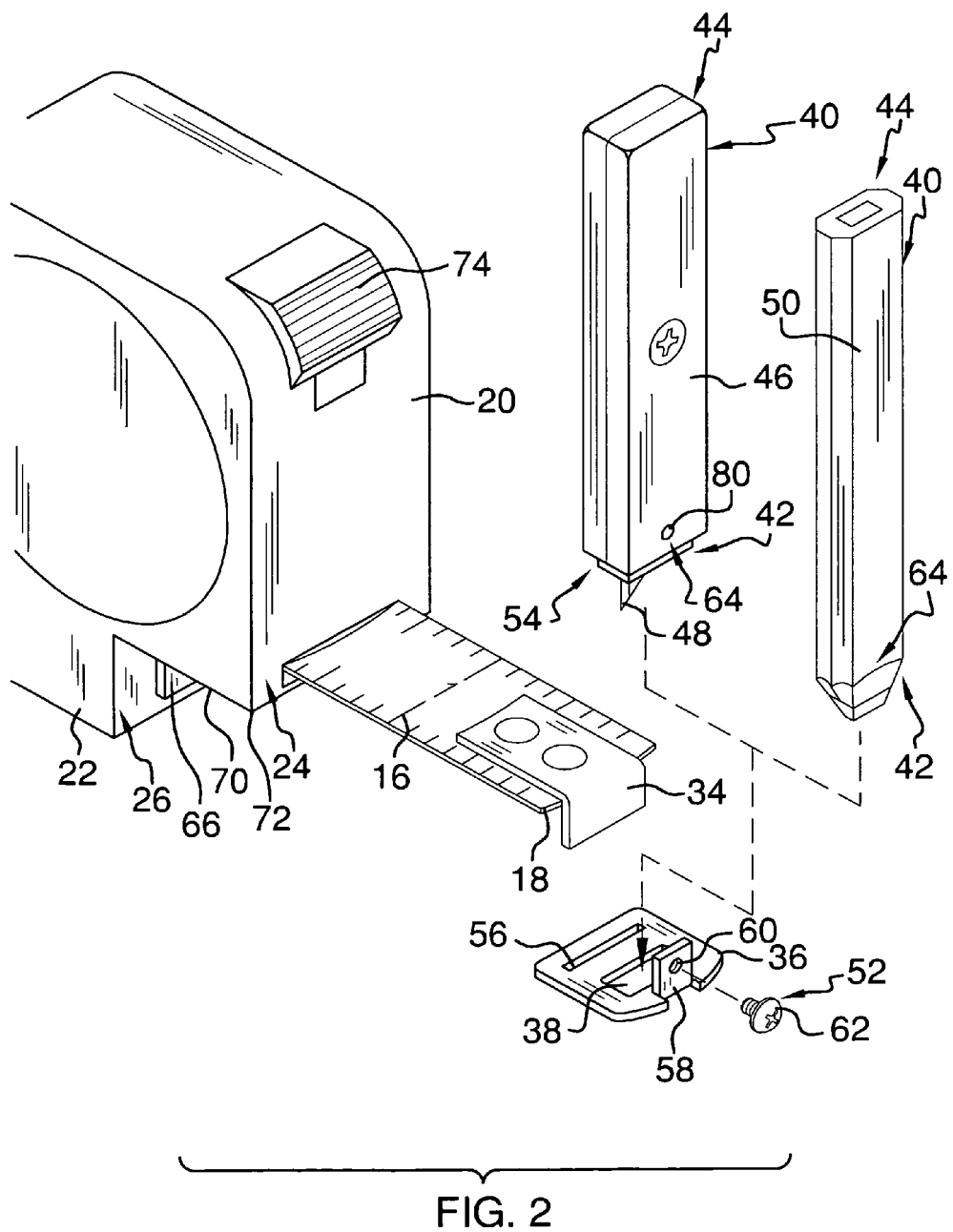
FIG. 2 is a top front side perspective view of an embodiment of the disclosure.
Figure 5:
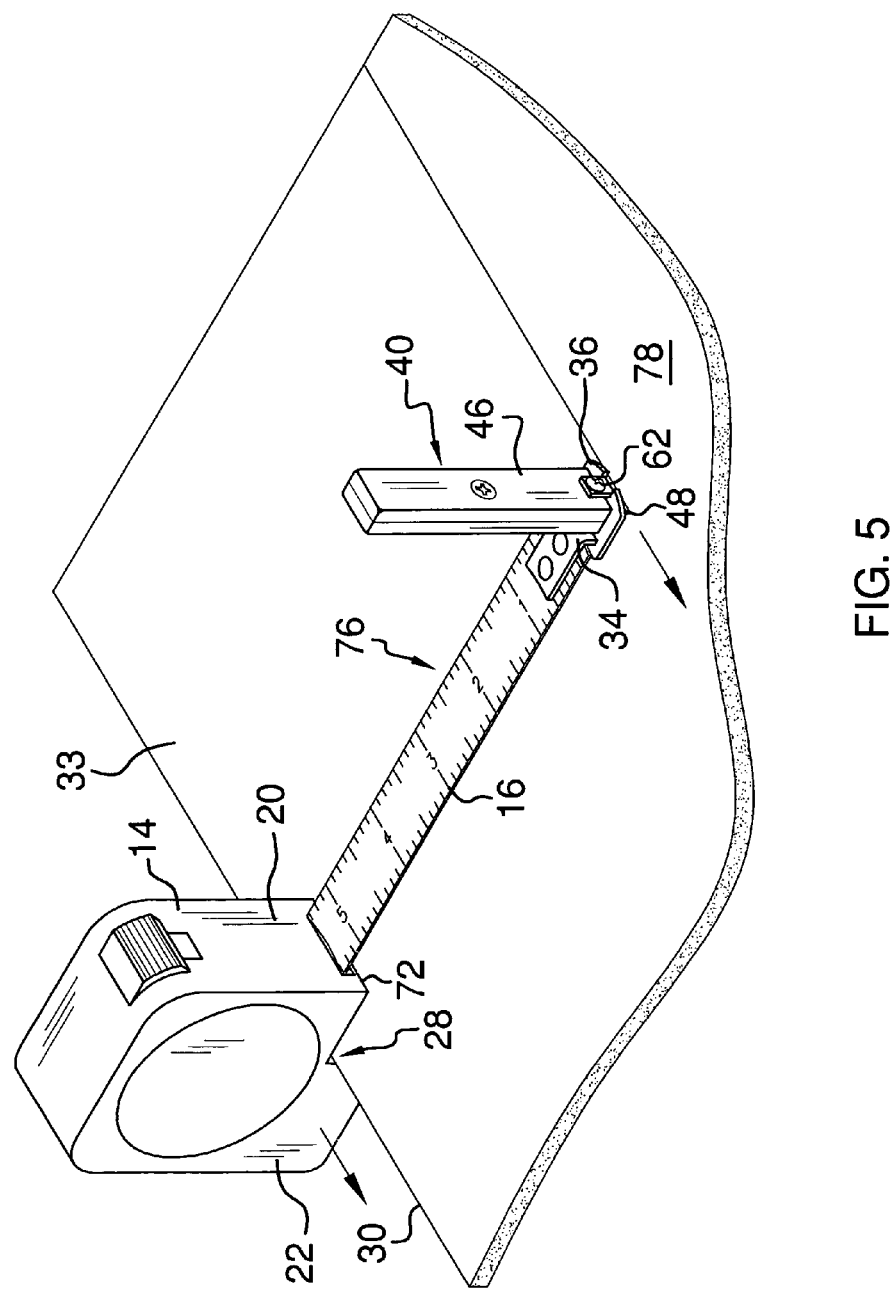
FIG. 5 is a top front side perspective view of an embodiment of the disclosure in use.

With reference now to the drawings, and in particular to FIGS. 1 through 6 thereof, a new tape measure device embodying the principles and concepts of an embodiment of the disclosure and generally designated by the reference numeral 10 will be described.

As best illustrated in FIGS. 1 through 6, the tape measure assembly 10 generally comprises a tape measure 12 having a housing 14. A tape 16 is coupled to and positioned in the housing 14. The tape 16 has a free end 18 extendable from the housing 14. The housing 14 may also have a top section 20 and a bottom section 22. The tape 16 extends from a forward side 24 of the top section 20. A forward side 26 of the bottom section 22 is offset from the forward side 24 of the top section 20 forming a lip 28 configured for abutting an edge 30 of a piece 32 being measured by the tape 16 such as a sheet of drywall. A first bearing member 66 may be coupled to the forward side 26 of the bottom section 22 of the housing 14. A second bearing member 68 may be coupled to a lower surface 70 of the top section 20 of the housing 14 extending between a forward edge 72 of the top section 20 of the housing 14 and the forward side 26 of the bottom section 22 of the housing 14. A tape lock 74 may be coupled to the housing 14. The tape lock 74 is operationally coupled to the tape 16 for holding the tape 16 in an extended position 76.

A tang 34 is coupled to the free end 18 of the tape 16. An attachment member 36 is selectively couplable to the tang 34. A tool aperture 38, which may be rectangular, extends through the attachment member 36. An elongated slot 56 extends through the attachment member 36. The tang 34 is insertable through the elongated slot 56 whereby the attachment member 36 is coupled to the free end 18 of the tape 16. The slot 56 may be complimentary to the shape of the tang 34 to hold the attachment member 36 in a static position relative to the tang 34 when the tang 34 is inserted through the slot 56.

A plurality of tools 40 is provided. A selectable one of the tools 40 is couplable to the attachment member 36. Each tool 40 has a first end 42 and a second end 44. The first end 42 of each tool 40 is insertable through the tool aperture 38 when the tool 40 is coupled to the attachment member 36. The plurality of tools 40 includes a knife 46 having a blade 48 selectively extendable from the first end 42 of the knife 46. The first end 42 of the knife 46 may be shaped complimentary to the tool aperture 38 whereby the blade 48 is held in a static position relative to the attachment member 38 when the first end 42 is inserted through the tool aperture 38. The blade 48 may be oriented transverse to the direction of extension of the tape 16 from the housing 14. Thus, the blade 46 may cut the piece 32 as the housing 14 is drawn along the edge 30 of the piece 32 at a measured distance from the edge 30. A rim 54 extends around the knife 46. The rim 54 is spaced from the first end 42 of the knife 46 whereby the rim 54 abuts the attachment member 36 when the first end 42 is inserted through the tool aperture 38. The plurality of tools 40 may also include a writing device 50 such as a carpenter's pencil. The first end 42 of the writing device 50 is configured for marking on a surface 78 of the piece 32 at a measured distance from the edge 30 of the piece 32.

A locking member 52 is coupled to the attachment member 36. The locking member 52 selectively engages the tool 40 when the first end 42 of the tool 40 is inserted through the tool aperture 38. Thus, the tool 40 is coupled to the attachment member 36. A tab 58 is coupled to and extends from the attachment member 36 adjacent to the tool aperture 38. A threaded opening 60 extend may extend through the tab 58. The locking member 52 may be a screw 62 threadably coupled to and extending through the tab 58. The screw 62 frictionally engages an outer surface 64 of the tool 40 when the first end 42 of the tool 40 is inserted through the tool aperture 38. The knife 46 may have a cavity 80 to receive the screw 62. The cavity 80 may be threaded or non-threaded.

In use, the desired tool 40, either the knife 46 or the writing device 50, is selected and coupled to the attachment member 36. The tape 16 may be extended from the housing 14 a desired length before or after inserting the tang 34 into the slot 56. The housing 14 is then positioned against the edge 30 of the piece 32 permitting marking or cutting of the piece 32 by sliding the housing 14 and the tool 40 in unison. Thus, a straight demarcation or cut at a desired length is facilitated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A tape measure assembly comprising:
   a tape measure having a housing, a tape coupled to and positioned in said housing, said tape having a free end extendable from said housing;
   a tang coupled to said free end of said tape;
   an attachment member, said attachment member being selectively couplable to said tang;
   a tool aperture extending through said attachment member;
   a tool having a first end and a second end, said first end being insertable through said tool aperture;
   a locking member coupled to said attachment member, said locking member selectively engaging said tool when said first end is inserted through said tool aperture whereby said tool is coupled to said attachment member;
   a tab coupled to and extending from said attachment member adjacent to said tool aperture; and
   a threaded opening extending through said tab, said locking member being a screw threadably coupled to and extending through said tab whereby said screw frictionally engages said tool when said first end of said tool is inserted through said tool aperture, said tool having a cavity, said cavity receiving said screw.

2. The assembly of claim 1, further including said tool being a knife having a first end and a second end, said knife having a blade selectively extendable from said first end of said knife.

3. The assembly of claim 2, further including a rim extending around said knife, said rim being spaced from said first end of said knife whereby said rim abuts said attachment member when said first end is inserted through said tool aperture.

4. The assembly of claim 3, further including said first end of said knife being shaped complimentary to said tool aperture whereby said blade is held in a static position relative to said attachment member when said first end is inserted through said tool aperture.

5. The assembly of claim 1, further including an elongated slot extending through said attachment member, said tang being insertable through said elongated slot whereby said attachment member is coupled to said free end of said tape.

6. The assembly of claim 1, further including said tool aperture being rectangular.

7. The assembly of claim 1, further including said housing having a top section and a bottom section, said tape extending from a forward side of said top section, a forward side of said bottom section being offset from said forward side of said top section forming a lip configured for abutting an edge of a piece being measured by said tape.

8. The assembly of claim 7, further including a first bearing member coupled to said forward side of said bottom section of said housing.

9. The assembly of claim 8, further including a second bearing member coupled to a lower surface of said top section of said housing extending between said forward edge of said top section of said housing and said forward side of said bottom section of said housing.

10. The assembly of claim 1, further including a tape lock coupled to said housing, said tape lock being operationally coupled to said tape for holding said tape in an extended position.

11. A tape measure assembly comprising:
    a tape measure having a housing, a tape coupled to and positioned in said housing, said tape having a free end extendable from said housing, said housing having a top section and a bottom section, said tape extending from a forward side of said top section, a forward side of said bottom section being offset from said forward side of said top section forming a lip configured for abutting an edge of a piece being measured by said tape;
    a tang coupled to said free end of said tape;
    an attachment member, said attachment member being selectively couplable to said tang;
    a rectangular tool aperture extending through said attachment member;
    a tool being couplable to said attachment member, said tool having a first end and a second end, said first end of tool being insertable through said tool aperture when said tool is coupled to said attachment member, said tool being a knife having a first end and a second end, said knife having a blade selectively extendable from said first end of said knife, said first end of said knife being shaped complimentary to said tool aperture whereby said blade is held in a static position relative to said attachment member when said first end is inserted through said tool aperture;
    a locking member coupled to said attachment member, said locking member selectively engaging said tool when said first end of said tool is inserted through said tool aperture whereby said tool is coupled to said attachment member;
    a rim extending around said knife, said rim being spaced from said first end of said knife whereby said rim abuts said attachment member when said first end is inserted through said tool aperture;
    an elongated slot extending through said attachment member, said tang being insertable through said elongated slot whereby said attachment member is coupled to said free end of said tape;
    a tab coupled to and extending from said attachment member adjacent to said tool aperture;
    a threaded opening extending through said tab, said locking member being a screw threadably coupled to and extending through said tab whereby said screw frictionally engages said tool when said first end of said tool is inserted through said tool aperture, said tool having a cavity, said cavity receiving said screw;
    a first bearing member coupled to said forward side of said bottom section of said housing;
    a second bearing member coupled to a lower surface of said top section of said housing extending between said forward edge of said top section of said housing and said forward side of said bottom section of said housing; and a tape lock coupled to said housing, said tape lock being operationally coupled to said tape for holding said tape in an extended position.

\* \* \* \* \*